US010664262B2

(12) United States Patent
Zimmermann et al.

(10) Patent No.: US 10,664,262 B2
(45) Date of Patent: May 26, 2020

(54) BINARY SUPPRESSION AND MODIFICATION FOR SOFTWARE UPGRADES

(71) Applicant: CrowdStrike, Inc., Irvine, CA (US)

(72) Inventors: Cat S. Zimmermann, Lake Forest Park, WA (US); Steven King, Bellevue, WA (US)

(73) Assignee: CrowdStrike, Inc., Irvine, CA (US)

( * ) Notice: Subject to any disclaimer, the term of this patent is extended or adjusted under 35 U.S.C. 154(b) by 100 days.

(21) Appl. No.: 15/690,182

(22) Filed: Aug. 29, 2017

(65) Prior Publication Data

US 2019/0065171 A1 Feb. 28, 2019

(51) Int. Cl.
*G06F 9/44* (2018.01)
*G06F 8/65* (2018.01)
(Continued)

(52) U.S. Cl.
CPC ............ *G06F 8/65* (2013.01); *G06F 8/71* (2013.01); *G06F 9/44557* (2013.01);
(Continued)

(58) Field of Classification Search
CPC ..... G06F 8/65; G06F 8/61; G06F 8/60; G06F 8/71; G06F 8/658; G06F 3/123
See application file for complete search history.

(56) References Cited

U.S. PATENT DOCUMENTS

2012/0131566 A1 5/2012 Morgan et al.
2015/0012487 A1* 1/2015 Ashok ................. G06F 8/60
707/610
(Continued)

FOREIGN PATENT DOCUMENTS

EP 2750036 8/2015

OTHER PUBLICATIONS

Nicholas Nethercote and Julian Seward, Valgrind: A Framework for Heavyweight Dynamic Binary Instrumentation, ACM, 2007, retrieved online on Jan. 13, 2020, pp. 89-100. Retrieved from the Internet: <URL: http://citeseerx.ist.psu.edu/viewdoc/download?>. (Year: 2007).*
(Continued)

*Primary Examiner* — Hanh Thi-Minh Bui
(74) *Attorney, Agent, or Firm* — Lee & Hayes, P.C.

(57) ABSTRACT

A remote security system may generate multiple different binary programs for corresponding operating system (OS) kernel versions that are to receive a software upgrade. A suppression process may then compare code in the code sections between pairs of binary programs, and may also compare the data in the data sections between the pairs of binary programs to identify subsets of "identical" binaries. The remote security system may send a representative binary (while suppressing the remaining binaries in a subset of identical binaries) to host computing devices that run different OS kernel versions. On the receiving end, a host computing device that runs a particular OS kernel version may receive a binary program, and prior to loading the binary program, modify the binary program to render the binary loadable by (or compatible with) the particular OS kernel version running on the host computing device.

22 Claims, 7 Drawing Sheets

(51) Int. Cl.
G06F 9/445 (2018.01)
G06F 21/56 (2013.01)
G06F 21/57 (2013.01)
G06F 8/71 (2018.01)

(52) U.S. Cl.
CPC ........ G06F 9/44589 (2013.01); G06F 21/563 (2013.01); G06F 21/57 (2013.01)

(56) References Cited

U.S. PATENT DOCUMENTS

| 2015/0339119 | A1* | 11/2015 | Rehman | G06F 8/54 |
| | | | | 717/121 |
| 2016/0077823 | A1* | 3/2016 | Zhang | G06F 8/65 |
| | | | | 717/171 |
| 2017/0046134 | A1* | 2/2017 | Straub | G06F 8/36 |

OTHER PUBLICATIONS

The Extended European Search Report dated Oct. 24, 2018, for European Patent Application, 18190937.5, 7 pages.

* cited by examiner

Identical Binaries

Not Identical Binaries

Not Identical Binaries

| BINARY MODIFICATION INFORMATION 128 |||
|---|---|---|
| BINARY 110 | OS KERNEL VERSION 300 | Modification(s) 302 |
| 110(1) | V1.X 300(1) | Null |
| 110(1) | V2.X 300(2) | OVERWRITE CRC W/: "XYZ" |
| 110(2) | V2.X 300(2) | Null |
| ⋮ | ⋮ | ⋮ |
| 110(N) | V2.X 300(2) | OVERWRITE CRC W/: "PQR" |

FIG. 3

BINARY SUPPRESSION AND MODIFICATION FOR SOFTWARE UPGRADES

BACKGROUND

With Internet use forming an ever greater part of day to day life, malicious software—often called "malware"—that steals or destroys system resources, data, and private information is an increasing problem. Governments and businesses devote significant resources to preventing intrusions by malware. Malware comes in many forms, such as computer viruses, worms, trojan horses, spyware, keystroke loggers, adware, and rootkits. Some of the threats posed by malware are of such significance that they are described as cyber terrorism or industrial espionage.

A current approach to counter these threats includes using a security agent that executes locally on a host computing device and interacts with a remote security system in "the Cloud." The security agent and the remote security system work together to detect malware attacks by observing and analyzing events that occur on the computing device, and possibly other host machines as well. When it comes time to deploy an upgrade to the security agent, a programmer can develop the source code for the upgrade. Because host machines can run a variety of different operating system (OS) kernel versions, the source code for a given upgrade may produce multiple different binaries that correspond to each different OS kernel version. As an example, imagine that there are 100 different OS kernel versions that are to be supported for a given software upgrade. In this example, 100 distinct binaries would be generated; one binary for each OS kernel version.

However, there are problems with this "one binary per OS kernel version" approach to deploying software upgrades. Firstly, each binary program is to be tested before being deployed. Such testing may be aimed at diagnosing compiler bugs, for example, which can be a computationally expensive process. Secondly, resources (e.g., memory, processing, and/or networking resources) are consumed as part of the upgrade process that may involve downloading binary programs over a computer network. As the number of supported OS kernel versions continues to increase, a large amount of these resources are consumed during an upgrade, which is suboptimal.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 3 illustrates an example table that includes binary modification information accessible to host computing devices to load a binary program that was created for a different OS kernel version.

DETAILED DESCRIPTION

Figure 1A:
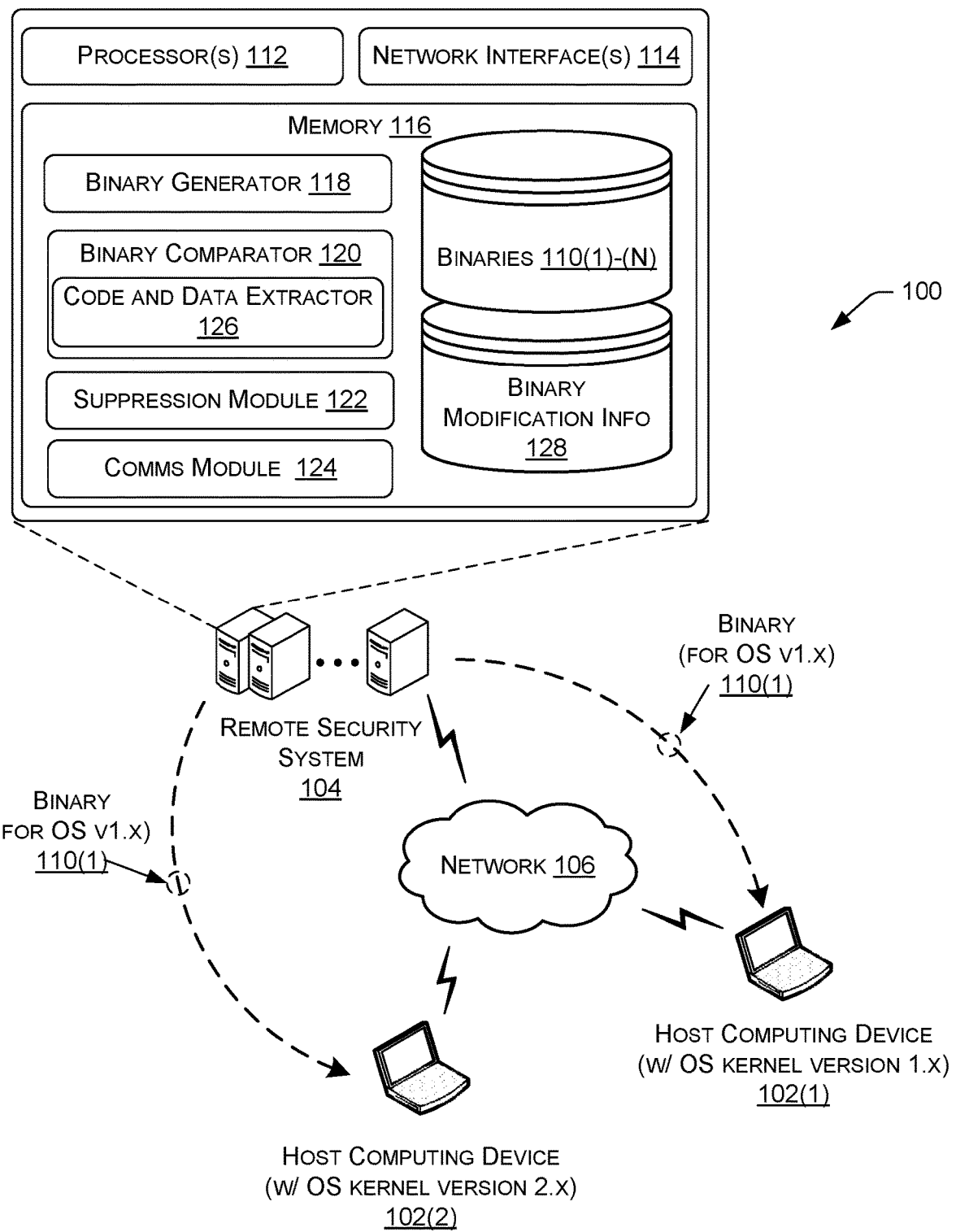
FIG. 1A illustrates an example environment showing example computing devices running different OS kernel versions, the environment also showing a remote security system that is configured to suppress binary programs associated with a software upgrade, and to send the binary programs to the computing devices in order to deploy the software upgrade.

This disclosure describes, in part, a remote security system that is configured to conserve various resources by suppressing binary programs that are generated for different operating system (OS) kernel versions as part of a software upgrade. In this suppression process, the remote security system may initially generate one binary program for each supported OS kernel version that is to receive a software upgrade. Subsequently, in order to reduce the number of binaries that are ultimately deployed to host machines (and thereby conserve resources that would have been used to test, process, load, or otherwise handle those suppressed binaries), the remote security system can identify subsets of functionally-equivalent binary programs. These functionally-equivalent binary programs are referred to herein as "identical" binaries even though a pair of identical binaries may not be truly identical (i.e., a pair of "identical" binaries may in fact have some different characteristics and/or data between them).

Once subsets of identical binaries are determined, instead of sending all of the identical binaries in a subset to host machines that run corresponding OS kernel versions, the remote security system is configured to suppress the binaries by sending a representative binary from an individual subset of identical binaries to the host computing devices that run the different OS kernel versions corresponding to the binaries in the subset. Thus, "suppressing" binaries, as used herein, means refraining from sending one or more binaries, or data related thereto, to one or more host computing devices. Suppression, as used herein, can also include refraining from performing other actions involved with handling binary programs. Such additional actions may include, without limitation, testing actions, storing actions, processing/analyzing actions, loading actions, and/or any other suitable action that utilizes resources while handling binary programs.

According to various embodiments disclosed herein, binary suppression may occur as follows. A remote security system may generate multiple different binary programs for corresponding OS kernel versions that are to receive a software upgrade. As an example, the multiple different binary programs can include a first binary program for a first OS kernel version, and a second binary program for a second OS kernel version. Each binary program may be associated with the software upgrade and may include a code section and a data section. With respect to the first and second binary programs, the suppression process may compare the code in the code sections and may also compare the data in the data sections between the pair of binary programs. If the code in both binaries matches, and at least a portion of the data in both binaries matches, the first binary program is deemed "identical" to the second binary program for suppression purposes. The remote security system may then send the first binary program, and not the second binary program, to a first host computing device that runs the first OS kernel version and to a second host computing device that runs the second OS kernel version. Thus, instead of sending the second binary program to the second host computing device that runs the second OS kernel version, the first binary program (which is "identical" to the second binary program) is sent to the second host computing device because it is deemed "safe" to load on host computing devices that run the second OS kernel version, and there is no need to deploy the second binary program in addition to the first binary program.

This disclosure also describes, in part, a host computing device that is configured to load a binary program that was not created specifically for the OS kernel version running on the host computing device. In order to load such a binary program, the host computing device is configured to modify the binary, rendering the binary loadable by the OS kernel version running on the host computing device. This allows the remote security system suppress binaries, as described herein, which conserves resources utilized during an upgrade process.

According to various embodiments disclosed herein, binary modification on a host computing device may occur as follows. A host computing device that runs a particular OS kernel version may receive a binary program that is associated with a software upgrade. Prior to loading the binary program, however, the host computing device may access binary modification information to determine whether any modifications are to be applied to the binary program. If the accessed binary modification information indicates that one or more modifications are to be applied to the binary program, based on the particular OS kernel version, the modification(s) are applied to modify the binary program. The modified binary program is thereby rendered loadable by (or compatible with) the particular OS kernel version running on the host computing device, and the modified binary program is loaded by the particular OS kernel version.

The binary suppression and modification techniques described herein can allow for conserving resources (e.g., processing, memory, and/or networking resources) utilized during a software upgrade process. This is because the overall number of binary programs that are ultimately deployed as part of the upgrade can be reduced by suppressing some of the binary programs that were generated to support different OS kernel versions, and sending representative binaries that were generated for other OS kernel versions, yet deemed "safe" to load on the supported OS kernel versions. The reduced number of binary programs allow for reducing the amount of resources consumed during a software upgrade, as compared to utilizing each and every binary program that is generated for all supported OS kernel versions. For example, the remote security system need only test the representative binary programs that are sent to host computing devices instead of testing the entire set of binary programs (i.e., suppressed binaries need not be tested). As an illustrative example, imagine that 100 binary programs are generated for 100 corresponding OS kernel versions. If those 100 binary programs can be grouped into 10 subsets of identical binaries, per the techniques and systems described herein, the remote security system can test 10 representative binary programs instead of testing all 100 binary programs, which conserves a significant amount of resources involved in an otherwise computationally expensive process for testing binaries. Likewise, the remote security system can send only those 10 representative binary programs to host computing devices that run the 100 different OS kernel versions, thereby conserving other resources, such as network bandwidth, memory resources, and the like.

Although the type of software upgrades are often described herein, by way of example, to upgrading a security agent executing on a host computing device, it is to be appreciated that the techniques and systems may be applicable to other types of software (and/or firmware), such as non-security software and/or firmware. "Software" as used herein may include software, firmware, or a combination thereof. Furthermore, although OS kernel versions are often described herein with respect to a Linux OS, it is to be appreciated that the techniques and systems described herein may be applicable to other OS types, including Mac OS's, Windows OS's, and the like.

FIG. 1A illustrates an example environment 100 showing example computing devices 102(1) and 102(2) (collectively 102, and sometimes referred to as "host machines" 102) running different operating system (OS) kernel versions. For example, the computing device 102(1) runs a first OS kernel version (e.g., version 1.x), while the computing device 102(2) runs a second OS kernel version (e.g., version 2.x). These may represent different versions of a particular type of OS, such as a Linux OS, for example.

Linux is a member of the family of UNIX OS's, and may be run on a variety of computer platforms, including personal computers with an x86 processor. Linux is a free, open-ended implementation of UNIX, and source code for a Linux kernel is available to the public, and is continuously being improved and otherwise modified. As improvements and/or other alterations to the Linux kernel are made and generally adopted by the public, new Linux versions are released. It is to be appreciated that the actual version identifiers used to identify corresponding Linux kernel versions may differ from the version identifiers (i.e., 1.x, 2.x, and so on) used herein to identify different OS kernel versions. Two OS kernel versions may be different in various ways. For example, one version of an OS kernel may have additional modules that are not in another version. As another example, modules of respective OS kernel versions may perform the same task(s) but in different ways. These and/or other differences may cause the existence of multiple OS kernel versions.

As illustrated in FIG. 1A, each of the computing devices 102 may interact with a remote security system 104 over a network 106. Such a security system 104 may be implemented as a cloud of security service devices, and is sometimes referred to herein as a "remote security service" 104 or a "security service cloud" 104. In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the computing device 102 and the remote security system 104 communicate over the network 106 using a secure protocol (e.g., https) and/or any other protocol or set of protocols, such as the transmission control protocol/Internet protocol (TCP/IP).

It is to be appreciated that the remote security system 104 may be configured to provide a security service to a large number of host computing devices 102. FIG. 1A shows two host computing devices 102 merely for illustrative purposes, when in fact, the environment 100 can include many more host computing devices 102 configured to interact with the remote security system 104. By way of example and not limitation, the remote security system 104 may interact with thousands of host computing devices 102. These thousands of host computing devices 102 may run hundreds of different OS kernel versions, as an example.

As will be described in more detail below with reference to the following figures, each of the host computing devices 102 may implement a security agent 108 (See e.g., FIG. 1B), which is a security software program that executes on the computing device 102. The security agent 108 may execute in the kernel mode of the computing device 102. During execution, the security agent 108 observes events, determines actions to take based on those events, and/or sends the events to the remote security system 104 for further processing and analysis.

The security agent 108 that runs on each of the computing devices 102 may be upgraded, as needed, to provide the security agent 108 with the latest features and functionality, which may be useful for detecting malware attacks on the computing device 102. To deliver these upgrades, the remote security system 104 is configured to generate and send, to the host computing devices 102, binary programs 110 (sometimes shortened to "binaries" 110). A binary program 110 may, in some embodiments, include a driver corresponding to an upgrade to the security agent 108 software that is installed on the respective computing devices 102. An individual binary program 110 may correspond to a specific OS kernel version for which the binary 110 was generated/created. Thus, the driver of a particular binary program 110 may be configured to execute on host computing devices 102 that run a particular OS kernel version. In some embodiments, a binary 110 may include drivers and headers built from the original source code for a particular upgrade to the security agent 108.

As shown in FIG. 1A, devices of the remote security system 104 may include one or more processors 112, network interfaces 114, and memory 116. The memory 116 may store, among other things, a binary generator 118 to generate binary programs 110(1)-(N) as part of an upgrade to the security agent 108, a binary comparator 120 to determine "identical" binaries, a suppression module 122 to suppress the binary programs 110 based on output of the binary comparator 120, and a communications (comms) module 124 to communicate with the security agents 108 of the computing devices 102, such as by sending a binary 110 to an individual computing device 102 as part of an upgrade to the security agent 108.

The binary generator 118 may be configured to generate a plurality of binary programs 110(1)-(N), each binary program 110 corresponding to a different OS kernel version (e.g., a different Linux kernel version). In the example of FIG. 1A, which shows two example host computing devices 102 in the environment 100, the binary generator 118 may generate a first binary program 110(1) for the first OS kernel version (e.g., version 1.x) running on the first host computing device 102(1), and a second binary program 110(2) for the second OS kernel version (e.g., version 2.x) running on the second host computing device 102(2). The individual binaries 110, being a function of a particular OS kernel version, are thereby unique to a particular OS kernel version. For example, an individual binary 110 may include a unique signature (e.g., unique identification data, such as a cyclic redundancy check (CRC)) that is to be authenticated by the particular OS kernel version upon loading the binary program 110 on the host computing device 102. This allows the kernel of the host computing device 102 to make sure that the binary 110 is safe to load on the host computing device 102 before it is loaded. Accordingly, for "N" different OS kernel versions ("N" being any suitable number) that are supported by the remote security system 104 for a given upgrade to the security agent 108, the binary generator 118 may generate "N" corresponding binaries 110(1)-(N). FIG. 1A shows that these binaries 110(1)-(N) may be maintained in the memory 116 of the remote security system 104, such as in a database, or a similar data store/repository.

Figure 2:
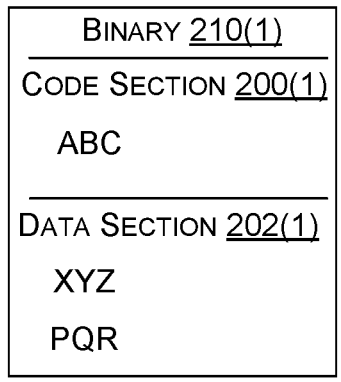
FIG. 2 is a schematic diagram of how the remote security system determines whether binaries are "identical" for suppression purposes.
Figure 2:
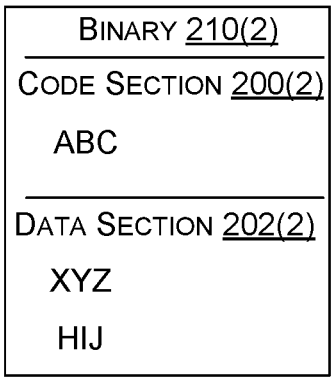
Figure 2:
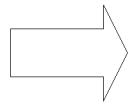
Figure 2:
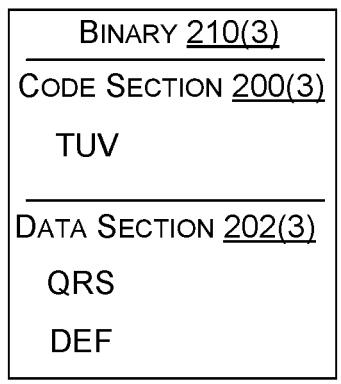
Figure 2:
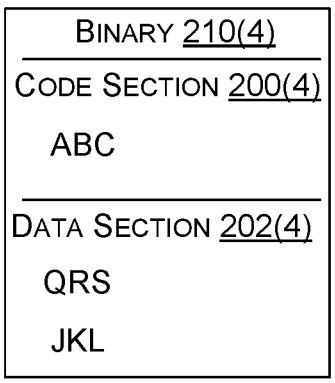
Figure 2:
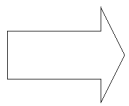
Figure 2:
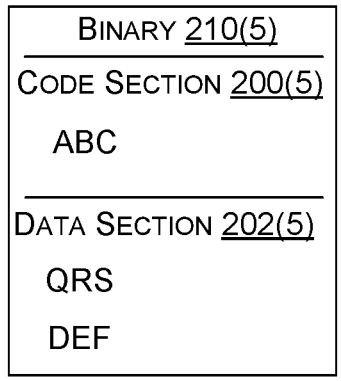
Figure 2:
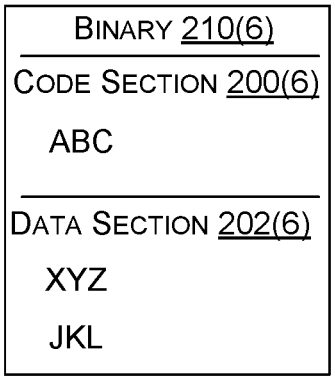
Figure 2:
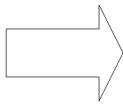

The binary comparator 120 may be configured to compare respective binaries 110 of individual pairs of binaries 110. The comparison may include, for example, comparing code in the respective code sections of the binaries 110. The comparison may additionally, or alternatively, include comparing data in the respective data sections of the binaries 110. Turning briefly to FIG. 2, these code and data sections, and a comparison technique that can be utilized by the binary comparator 120 is shown in further detail.

As shown in FIG. 2, a comparison of a first binary 210(1) and a second binary 210(2) may include a comparison of code and data in their respective code and data sections 200 and 202, respectively. For instance, the individual binaries 210 may include a code section 200, which may be executable, and a data section 202, which may be non-executable. Although not shown in FIG. 2, the individual the binaries 210 also include a header that stores information about the memory size of the code section 200 and the memory size of the data section 202, and the header may also provide information on how to load the binary 210 into memory. A host computing device 102 may utilize the header information to allocate a suitable amount of memory and carry out the instructions to load the binary 210.

The code in the code section 200 and the data in the data section 202 may be extracted and analyzed (e.g., compared between binaries 210) to determine whether a given pair of binaries 210 are identical. For example, the binary comparator 120 may compare first code in the code section 200(1) of the first binary 210(1) with second code in the code section 200(2) of the second binary 210(2) to determine if the first code matches the second code. Here, the first code in the code section 200(1) is represented as code "ABC", and the second code in the code section 200(2) is also represented as code "ABC", which indicates that the same (matching) code is in each of the code sections 200(1) and 200(2). Thus, the binary comparator 120 would determine that the first code ("ABC") in the code section 200(1) of the first binary 210(1) matches the second code ("ABC") in the code section 200(2) of the second binary 210(2). It is to be appreciated that the example code "ABC" is not actual executable code, but is merely used as an illustrative example. In implementation, "ABC" would be replaced with actual executable code. This is also to be appreciated for the example data shown in the data sections 202 of FIG. 2.

The binary comparator 120 may also compare first data in the data section 202(1) of the first binary 210(1) with second data in the data section 202(2) of the second binary 210(2) to determine if at least some of the first data matches at least some of the second data. Here, the first data in the data section 202(1) is shown as including data "XYZ" and data "PQR", while the second data in the data section 202(2) is shown as including data "XYZ" and data "HIJ". Thus, the binary comparator 120 may determine that at least a portion (e.g., some, but not all) of the first data (e.g., data "XYZ") in the data section 202(1) of the first binary 210(1) matches at least a portion (e.g., some, but not all) of the second data (e.g., data "XYZ") in the data section 202(2) of the second binary 210(2).

As shown in FIG. 2, some of the first data in the data section 202(1) of the first binary 210(1) may not match some of the second data in the data section 202(2) of the second binary 210(2) (e.g., data "PQR" does not match data "HIJ"). Nevertheless, the binaries 210(1) and 210(2) are considered to be "identical" for purposes of suppression as described herein because they have matching code (e.g., code "ABC") and some matching data (e.g., data "XYZ"). Said another way, the first binary 210(1) may not include some data (e.g., data "HIJ") in its data section 202(1), while that particular data (e.g., data "HIJ") may be included in the data section 202(2) of the second binary 210(2), and vice versa (e.g., the second binary 210 may not include data "PQR" in its data section 202(2) even though data "PQR" is included in the data section 202(1) of the first binary 210(1)). The binaries 210(1) and 210(2) in FIG. 2 are an example of "identical" binaries, meaning that they are functionally equivalent. In other words, the first binary 210(1)—although having been generated for a first OS kernel version—is safe to load on a host computing device 102 running a second OS kernel version for which the second binary 210(2) was generated, and vice versa.

FIG. 2 also shows two examples of binary pairs that are not "identical." For example, as a result of comparing a first binary 210(3) to a second binary 210(4), the binary comparator 120 may determine that the first binary 210(3) is not identical to the second binary 210(4). Similarly, the binary comparator 120 may determine that a first binary 210(5) is not identical to a second binary 210(6).

In the case of the pair of binaries 210(3) and 210(4), although the first binary 210(3) shares some matching data (e.g., data "QRS") with the data of the second binary 210(4), the pair of binaries 210(3) and 210(4) do not have matching code in their respective code sections 200(3) and 200(4). This is shown by the first code (e.g., code "TUV") in the code section 200(3) of the first binary 210(3), which does not match the second code (e.g., code "ABC") in the code section 200(4) of the second binary 210(4). Due to their mismatching code, a condition for finding the binaries 210(3) and 210(4) to be identical has not been met, and, as a result, the binaries 210(3) and 210(4) are determined by the binary comparator 120 to be different (or not "identical"). This is a case of non-identical binaries due to mismatching code in their respective code sections 200(3) and 200(4).

In the case of the pair of binaries 210(5) and 210(6), although the first binary 210(5) shares the same code (e.g., code "ABC") with the code in the second binary 210(6), meeting one of two conditions for finding the pair of binaries 210(5) and 210(6) to be identical, the pair of binaries 210(5) and 210(6) do not have any matching data in their respective data sections 202(5) and 202(6), which does not satisfy the second condition for finding the pair of binaries 210(5) and 210(6) to be identical. This is shown in FIG. 2 by the first data in the data section 202(5) including data "QRS" and "DEF", which does not match the second data (e.g., data "XYZ" and "JKL" in the data section 202(6). This is a case of non-identical binaries due to mismatching data in their respective data sections 202(5) and 202(6).

Referring with specific reference again to FIG. 1A, the binary comparator 120 may include a code and data extractor 126 that is configured to extract code from code sections 200 of individual binaries 110/210, and to extract data from data sections 202 of the individual binaries 110/210 for purposes of comparing code and/or data between binaries 110/210. By comparing code and data between pairs of binaries 110/210 to identify identical binaries 110/210, as described herein, the binary comparator 120 may ultimately group (or categorize) the overall set of binaries 110(1)-(N) into subsets of identical binaries 110. Thus, a first subset of the binaries 110 may include any number of identical binaries 110 with matching code and some matching data, a second subset of the binaries 110 may include any number of identical binaries 110 with matching code and some matching data, and so on, for any number of subsets of identical binaries 110 that share common code and some common data.

The suppression module 122 may be configured to suppress the binaries 110 based at least in part on the output of the binary comparator 120 (i.e., based at least in part on the subsets of identical binaries 110/210). For example, the suppression module 122 can select a representative binary 110/210 from each subset/group of identical binaries 110/210 that is to be further processed and sent to multiple host computing devices 102 as part of deploying a software upgrade. More specifically, each binary 110/210 in a subset of identical binaries corresponds to a particular OS kernel version. In this manner, a subset of identical binaries 110/210 are associated with a corresponding set of OS kernel versions to which they pertain. Accordingly, for a given subset of identical binaries 110/210, the suppression module 122 can select a representative binary 110/210 among the binaries 110/210 in the subset to deploy the upgrade to host computing devices 102 running the different OS kernel versions that correspond to the identical binaries 110/210 in the subset.

In the example of FIG. 1A, assume that a subset of identical binaries includes a first binary 110(1) and a second binary 110(2), and possibly additional binaries 110 that are deemed identical to the first and second binaries 110(1) and 110(2), as described herein. For this particular subset of identical binaries 110, the suppression module 122 may select the first binary 110(1) as a representative binary, and may thereafter test the first binary 110(1) for compiler bugs and other issues, and send the first binary 110(1) to host computing devices 102 that run all of the different OS kernel versions associated with the identical binaries in the subset. That is, the communications module 124 may send the first binary 110(1) (i.e., a representative binary 110) to the first host computing device 102(1) running the first OS kernel version (version 1.x), and also to the second host computing device 102(2) running the second OS kernel version (version 2.x), without using resources to test and send the second binary 110(2) (or any other binaries 110 included in the subset). Thus, even though the second binary 110(2) was generated specifically for the second OS kernel version that runs on the second host computing device 102(2), the second binary 110(2) is suppressed (e.g., by refraining from sending the second binary 110(2) to the second host computing device 102(2)), and the first binary 110(1)—deemed identical to the second binary 110(2)—is tested and sent to the second host computing device 102(2) in lieu of the second binary 110(2). Because the binary comparator 120 deemed the first binary 110(1) identical to the second binary 110(2), the implication is that the first binary 110(1) is safe to load on the second host computing device 102(2) running the second OS kernel version. In other words, the second host computing device 102 will be able to load the first binary 110(1) because the first binary 110(1) is functionally equivalent to the second binary 110(2).

FIG. 1A further shows that the remote security system 104 may be configured to generate and maintain, in the memory 116, binary modification information 128. The binary modification information 128 may include mappings between individual binaries 110 and OS kernel versions, along with associated modifications that are to be applied to the individual binaries 110 in the event that a host computing device 102 running the mapped OS kernel version receives the binary 110. In some embodiments, the binary modification information 128 may be generated after subsets of identical binaries 110 have been identified by the binary comparator 120. This is because the mappings in the binary modification information 128 may include mappings from each binary 110 in a subset to each of the OS kernel versions that correspond to the binaries 110 in the subset, and it may be wasteful (e.g., in terms of memory resources) to maintain mappings between a binary 110(1) and a particular OS kernel version if that particular OS kernel version is not associated with any of the binaries 110 in the subset with the binary 110(1).

FIG. 3 illustrates an example of the binary modification information 128 that can be generated and maintained by the remote security system 104. As shown in FIG. 3, the binary modification information 128 may include mappings between individual binaries 110 and individual OS kernel versions 300. Each of these mappings may be associated with one or more modifications 302 that are to be applied to the binary 110 in question by a host computing device 102 that runs the OS kernel version 300 in question. In some instances, there will be no associated modifications for an OS kernel version-to-binary mapping (e.g., NULL in a modification(s) 302 field).

Continuing with the example shown in FIG. 1A, the binary modification information 128 of FIG. 3 is shown as including a first mapping between the first binary program 110(1) and the first OS kernel version 300(1) (e.g., version 1.X). This first mapping has no associated modifications in the modification(s) 302 column because the first binary program 110(1) was generated specifically for the first OS kernel version 300(1), and no modifications are necessary for the first OS kernel version 300(1) to load the first binary program 110(1). A second mapping between the first binary program 110(1) and the second OS kernel version 300(2) (e.g., version 2.X) is associated with one or more modifications 302 to be applied to the first binary program 110(1) to render the first binary program 110(1) loadable by the second OS kernel version 300(2). The example of FIG. 3 shows an example where this modification(s) 302 comprises a modification to overwrite identification data in the form of a cyclic redundancy check (CRC) in the first binary program 110(1) with different identification data (e.g., CRC "XYZ"). This different identification data included in the modification(s) 302 field is compatible with the second OS kernel version. Thus, when a host computing device 102(2) running the second OS kernel version 300(2) receives the first binary 110(1), it can look up its OS kernel version and the received binary 110(1) in the binary modification information 128 table to determine the modification(s) 302 associated with the second mapping shown in FIG. 3. Upon applying the modification(s) 302 to the received binary program 110(1) (e.g., by overwriting a CRC in the first binary program 110(1) with a different CRC compatible with the second OS kernel version 300(2)), the host computing device 102(2) basically fools the second OS kernel version 300(2) into thinking that it is loading a binary 110(2) that it knows to be safe to load on the second OS kernel version 300(2), when, in fact, the binary 110 being loaded is the first binary 110(1).

The binary modification information 128 also shows additional mappings, such as a third mapping between the second binary 110(2) and the second OS kernel version (e.g., version 2.X), which is not associated with any modification(s) (e.g., NULL in a modification(s) 302 field), and an Nth mapping between an $N^{th}$ binary 110(N) and the second OS kernel version 300(2), along with one or more associated modifications. In this manner, any host computing device 102 running a particular OS kernel version 300 can, upon receipt of a binary 110 from the remote security system 104, access the binary modification information 128 to find the mapping between its OS kernel version 300 and the received binary 110 to determine what modification(s) 302, if any, are to be applied to the received binary 110 before it is loaded.

Figure 1B:
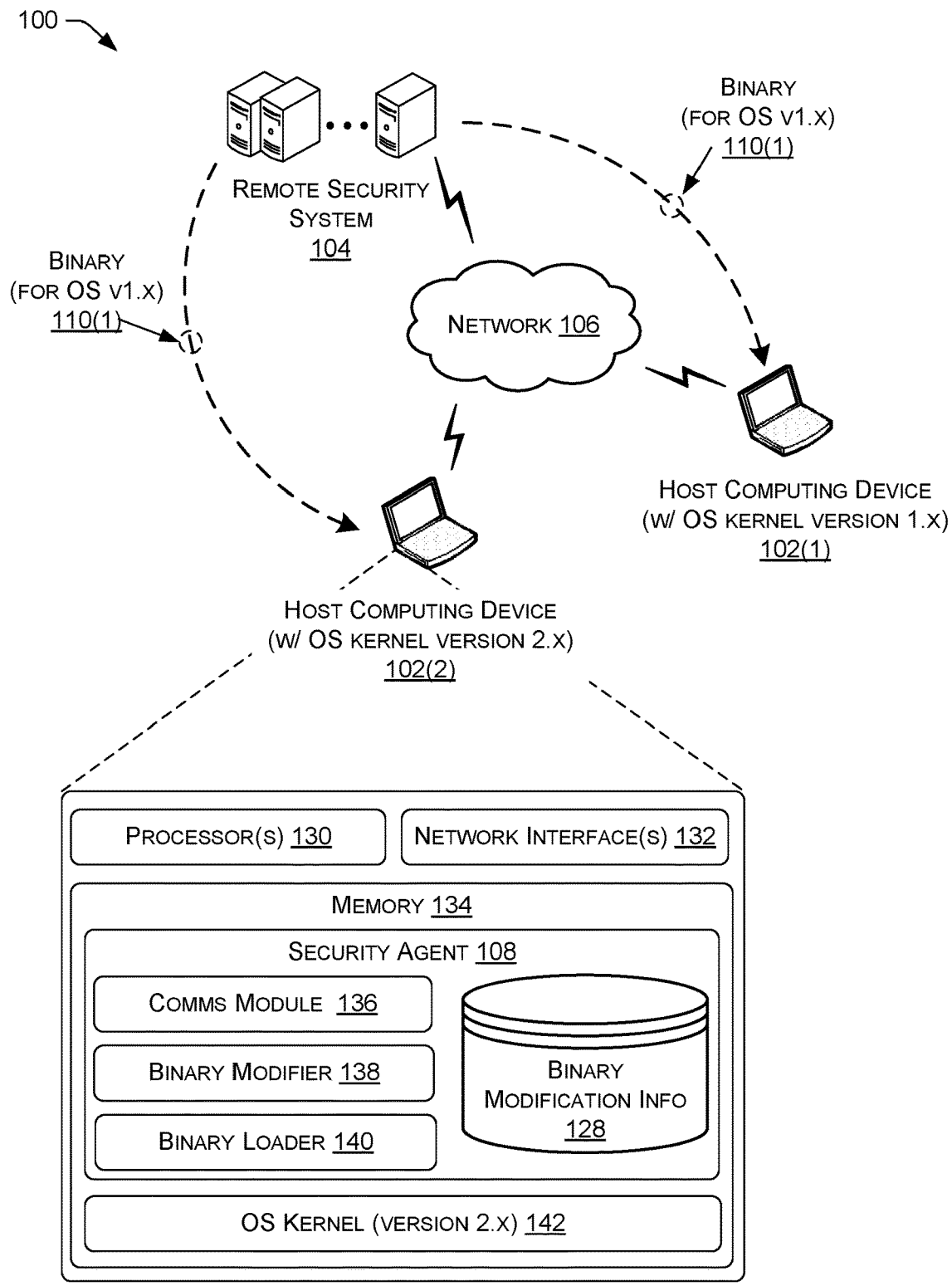
FIG. 1B illustrates the example environment of FIG. 1A, showing that the example computing devices are configured to modify a binary program received from the remote security system in order to render the binary program loadable on (or compatible with) its OS kernel version.

FIG. 1B illustrates the example environment 100 of FIG. 1A, showing that the example computing devices 102 in the environment 100 are configured to modify a binary program 110 received from the remote security system 104 in order to render the binary program 110 loadable on (or compatible with) its OS kernel version 300. As shown with reference to the host computing device 102(2), in addition to components such as one or more processors 130, one or more network interfaces 132, and memory 134, the host computing device 102(2) may implement a security agent 108, as mentioned above. The security agent 108 is shown as being stored in the memory 134 and executable by the processor(s) 130. As mentioned, the security agent 108 may be configured to observe events that occur on the computing device 102(2). In some embodiments, the security agent 108 operates as a virtual machine/shadow operating system, and may execute at least partially in the kernel mode of the computing device 102(2). The kernel mode and user mode of a computing device 102 correspond to protection domains—also known as rings—that protect data and functionality of the computing device 102 from faults and malware. Typically, the user mode is associated with the outermost ring and the least level of privileges to access memory and functionality, while the kernel mode is associated with an inner ring (sometimes the innermost ring, although in modern computing devices there is sometimes an additional level of privilege) and a higher level of privileges, as compared to the user mode, to access memory and functionality, including operating system 142 processes. In some embodiments, the security agent 108 may load before the operating system 142 of the computing device 102, such as by loading very early in the boot-time of the computing device 102 (e.g., the security agent 108 may load within the first few dozen instructions upon booting the computing device 102). By loading early in boot-time, the security agent 108 can significantly reduce the window in which malware can become active and interfere with operation of the computing device 102 or run unobserved on the computing device 102.

The security agent 108 may interact with the remote security system 104 for security purposes, such as detecting malicious activity/software on the computing device 102. As shown in FIG. 1B, the security agent 108 may further include a communications (comms) module 136 to communicate with the remote security system 104, such as by sending events, and/or data relating thereto, and by receiving binaries 110 over the network 106 from the remote security system 104 to implement an update to the security agent 108.

The security agent 108 may further include a binary modifier 138 to access the binary modification information 128, determine a modification(s) 302 to be applied to a received binary program 110, and to apply the modification(s) 302 to the received binary program 110 to render the binary program loadable by (or compatible with) the OS kernel version 300 running on the host computing device 102(2). FIG. 1B shows how the binary modification information 128 can be downloaded by the host computing device 102(2) from the remote security system 104 and maintained in local memory 134 of the host computing device 102(2). However, the binary modification information 128 can be maintained in the memory 116 of the remote security system 104 and made accessible to the host computing device 102(2) without downloading the binary modification information 128 to the host computing device 102(2), assuming network connectivity to the remote security system 104 is present at a time when the binary modifier 138 requests access to the binary modification information 128 in the Cloud. The security agent 108 may further include a binary loader 140 to request loading of a binary 110 (modified or unmodified) by the operating system (OS) 142. As shown in FIG. 1B, the OS 142 of the host computing device 102(2) is version 2.X, indicating that the OS 142 is of a particular OS kernel version 300 among multiple available/supported OS kernel versions 300.

In various embodiments, the computing devices 102 and devices of the remote security system 104 may each be or include a server or server farm, multiple, distributed server farms, a mainframe, a work station, a personal computer (PC), a laptop computer, a tablet computer, a personal digital assistant (PDA), a cellular phone, a media center, an embedded system, or any other sort of device or devices. In one implementation, the computing device(s) of the remote security system 104 represent a plurality of computing devices working in communication, such as a cloud computing network of nodes. When implemented on multiple computing devices, the remote security system 104 may distribute its modules and data among the multiple computing devices of the remote security system 104. In some implementations, one or more of the computing devices 102 and/or a computing device(s) of the remote security system 104 represents one or more virtual machines implemented on one or more computing devices.

As mentioned, the remote security system 104 and the computing device 102 include a processor(s) 112/130 and a network interface(s) 114/132. The processor(s) 112/130 may be or include any sort of processing unit, such as a central processing unit (CPU) or a graphic processing unit (GPU). The network interface(s) 114/132 allows the associated computing device to communicate with other computing devices in the environment 100 over the network(s) 106. The network interface(s) 114/132 may send and receive communications and/or data through one or both of the network 106 or other networks. The network interface(s) 114/132 may also support both wired and wireless connection to various networks.

The memories 116/134 (and other memories described herein) may store an array of modules and data, and may include volatile and/or nonvolatile memory, removable and/or non-removable media, and the like, which may be implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other non-transitory computer-readable medium which can be used to store the desired information and which can be accessed by a computing device.

It is to be appreciated that the host computing device 102(1) may include the same, or similar, modules and components to those described and shown with specific reference to the host computing device 102(2). In some instances, the remote security system 104 and/or the computing devices 102 may have features or functionality in addition to those that FIGS. 1A and 1B illustrate. For example, the remote security system 104 and/or the computing device 102 may also include additional data storage devices (removable and/or non-removable) such as, for example, magnetic disks, optical disks, or tape. The additional data storage media may include volatile and nonvolatile, removable and non-removable media implemented in any method or technology for storage of information, such as computer readable instructions, data structures, program modules, or other data. In addition, some or all of the functionality described as residing within any or all of the remote security system 104 and/or the computing device 102 may reside remotely from that/those device(s), in some implementations.

The processes described herein are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Figure 4:
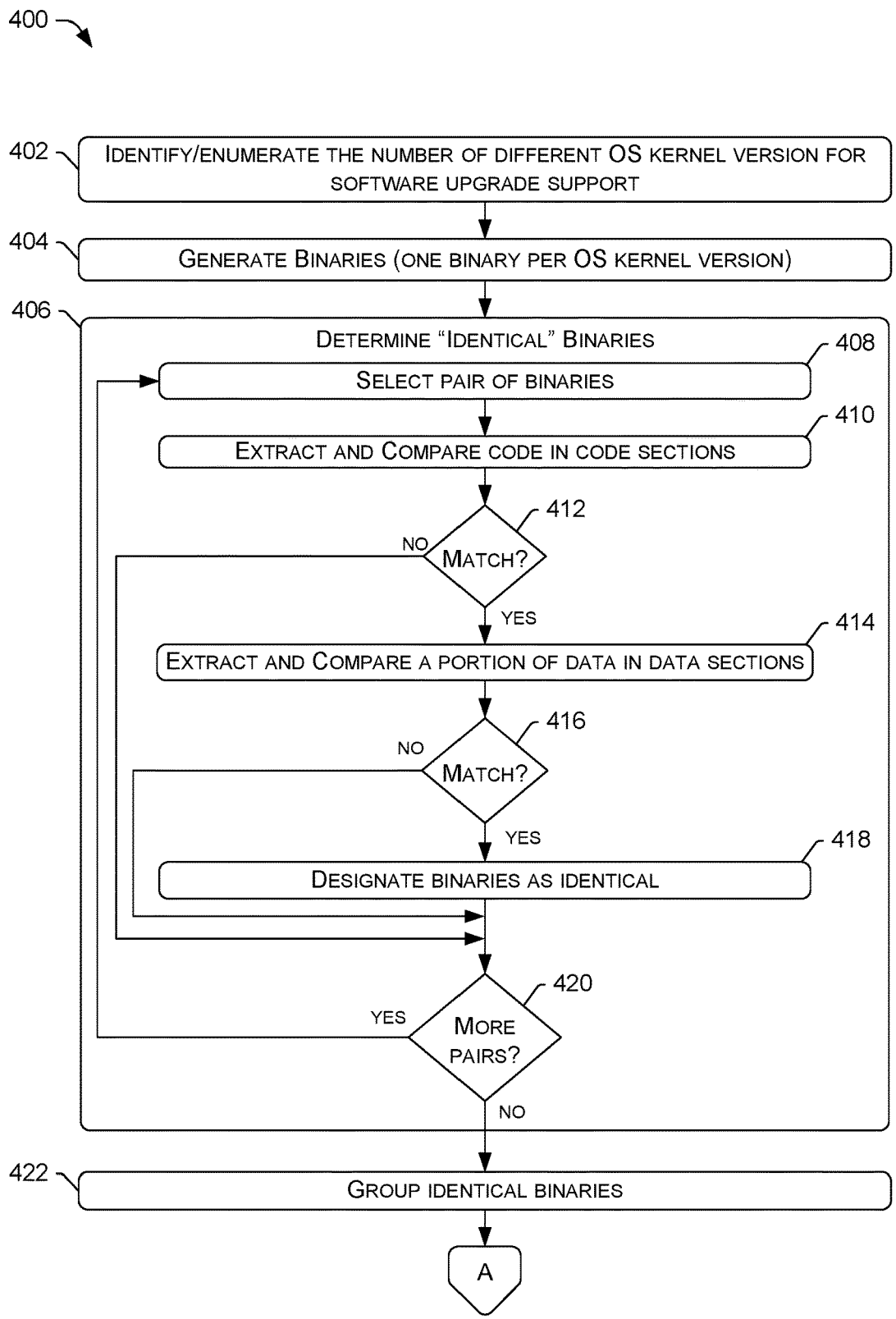
FIG. 4 illustrates an example process for grouping "identical" binaries for suppression purposes.

FIG. 4 illustrates an example process 400 for grouping "identical" binaries for suppression purposes. By way of example, and not limitation, the process 400 is described with reference to the previous figures, and in particular with reference to the binary generator 118 and the binary comparator 120 of the remote security system 104 in FIG. 1A.

At 402, the binary generator 118 of the remote security system 104 may identify or enumerate the number of different OS kernel versions 300 that are to be supported for a given software upgrade. As an example, for the Linux OS, the remote security system 104 may access information indicating the number of different Linux kernel versions available on the market and/or the number of different Linux kernel versions that are running on host computing devices 102 that are registered with the remote security service 104.

At 404, the binary generator 118 may generate one binary 110 per OS kernel version 300. As an illustrative example, assume that the binary generator 118 identifies 100 different OS kernel versions 300 that are to be supported. In this example, the binary generator 118 may generate, at block 404, 100 different binaries 110. Each binary 110 is generated from the source code for the given upgrade, and the OS environment (i.e., the OS kernel version 300) to be supported. In this sense, the binaries 110 are associated with the software upgrade via the source code that is developed for the upgrade. Furthermore, as described with reference to FIG. 2, individual binaries 110 generated at block 404 include a code section 200 and a data section 202. The code in the code section 200 and the data in the data section 202 for a given binary 110 may be a function of the kernel header for the particular OS kernel version 300 to be supported.

At 406, the binary comparator 120 of the remote security system 104 may determine subsets of identical binaries 110 from among the overall set of binaries 110 generated at block 404. As mentioned, finding a pair of binaries 110 to be "identical" means that the code, and at least some data, is common between the binaries 110, but "identical" binaries 110 can nevertheless include some characteristics or data that differs between them. For instance, each binary 110 may include a unique signature (or identification data) that pertains to a particular OS kernel version, among other unique characteristics and/or data.

Determining identical binaries 110 at block 406 may include selecting a pair of binaries 110(1) and 110(2) at block 408, and extracting and comparing code within the respective code sections 200 of the pair of binaries 110(1) and 110(2) at block 410. For example, the binary comparator 120 may compare first code extracted from the code section 200(1) of the first binary 110(1) to second code extracted from the code section 200(2) of the second binary 110(2).

At 412, the binary comparator 120 may determine whether the first code in the code section 200(1) of the first binary program 110(1) matches second code in the code section 200(2) of the second binary program 110(2). If the same (or common) code is found in both of the code sections 200(1) and 200(2) of the respective binaries 110(1) and 110(2), the process 400 proceeds by following the "yes" route from block 412 to block 414, where data within the respective data sections 202 of the pair of binaries 110(1) and 110(2) is extracted and compared. For example, at block 414, the binary comparator 120 may compare first data extracted from the data section 202(1) of the first binary 110(1) to second data extracted from the data section 202(2) of the second binary 110(2).

At 416, the binary comparator 120 may determine whether at least a portion (e.g., some, but not all) of the first data in the data section 202(1) of the first binary program 110(1) matches at least a portion (e.g., some, but not all) of the second data in the data section 202(2) of the second binary program 110(2). Notably, the determination at block 416 recognizes that there may be some data that differs between the pair of binaries 110(1) and 110(2), such as data that is unique to a particular OS kernel version 300. However, other data in the respective data sections 202(1) and 202(2) may be the same (or common) between the pair of binaries 110(1) and 110(2), indicating functional equivalence between the pair of binaries 110(1) and 110(2) despite the existence of some differing data.

If, at block 416, there is at least some data that is the same (or common) in both of the data sections 202(1) and 202(2) of the respective binaries 110(1) and 110(2), the process 400 proceeds by following the "yes" route from block 416 to block 418, where the pair of binaries 110(1) and 110(2) are designated as "identical" for purposes of suppression.

At 420, the binary comparator 120 determines whether there are any more pairs of binaries 110 to compare among the overall set of binaries 110(1)-(N) generated at block 404. If there are more pairs of binaries 110 that have not been compared, the process 400 proceeds by following the "yes" route from block 420 back to block 408 to select another pair of binaries 110 and to iterate over multiple pairs of binaries 110 by performing the actions of blocks 408-420.

Returning to block 412, if it so happens that the binary comparator 120 determines that the code in the respective code sections 200(1) and 200(2) of the pair of binaries 110(1) and 110(2) does not match, the process 400 proceeds by following the "no" route from block 412 to block 420, where the binary comparator 120 determines whether there are any more pairs of binaries 110 to compare among the overall set of binaries 110(1)-(N) generated at block 404. In some embodiments, a pair of binaries 110 may be designated as not identical, but this is purely optional, as it may be sufficient to track identical binaries 110 without tracking different binaries 110.

Similarly, at block 416, if it so happens that the binary comparator 120 determines that the data in the respective data sections 202(1) and 202(2) of the pair of binaries 110(1) and 110(2) does not match, the process 400 proceeds by following the "no" route from block 416 to block 420, where the binary comparator 120 determines whether there are any more pairs of binaries 110 to compare among the overall set of binaries 110(1)-(N) generated at block 404.

Proceeding through the sub-blocks 408-420 of block 406 for different pairs of binaries 110, once it is determined, at block 420 that all unique pairings of binaries 110 have been compared, the process 400 proceeds by following the "no" route from block 420 to block 422, where binaries 110 that were determined to be identical to each other at block 406 are organized into a subset of identical binaries 110. The result of block 422 may be a number of different subsets of identical binaries 110, organized (or categorized) into groups. Each group may be associated with an identifier to identify the group/subset of identical binaries 110.

Figure 5:
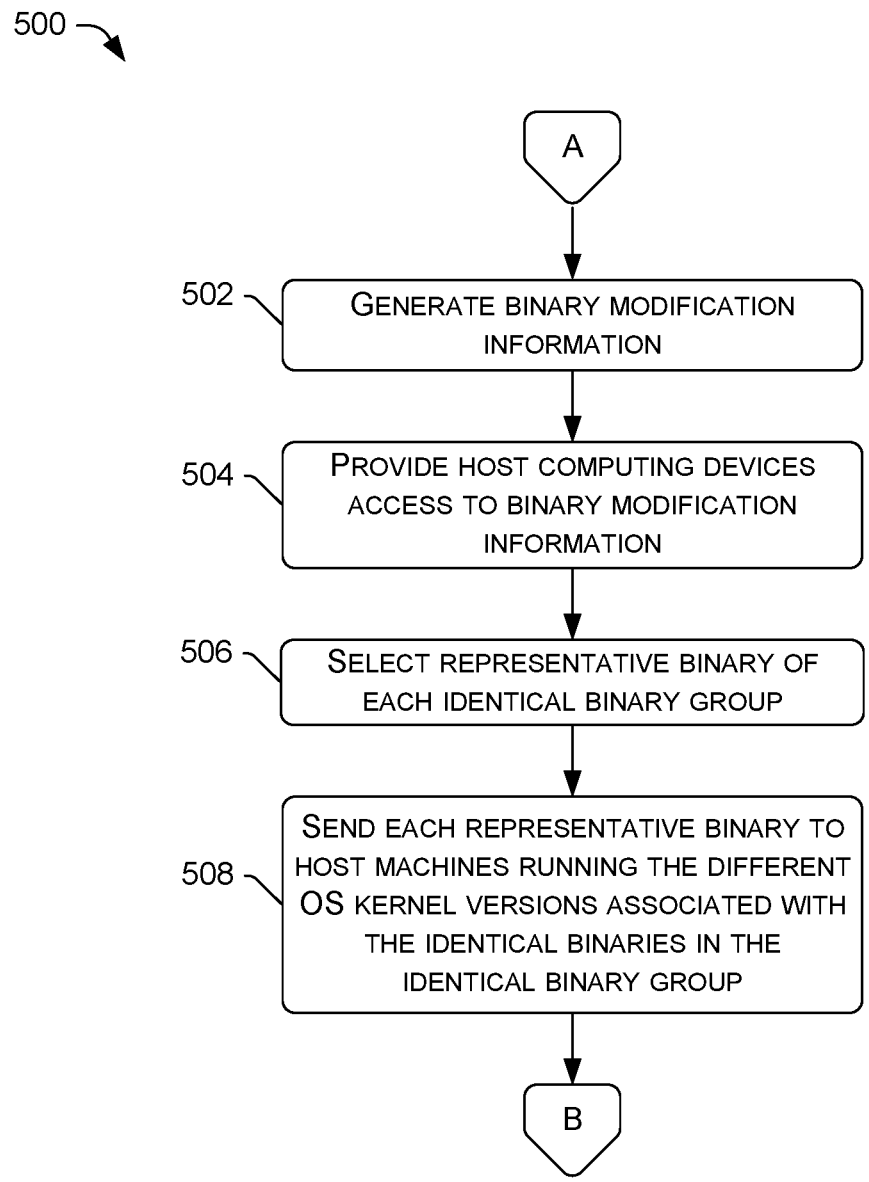
FIG. 5 illustrates an example process for generating and providing host machines access to binary modification information, and for sending a representative binary to host machines that run different OS kernel versions.

FIG. 5 illustrates an example process 500 for generating and providing host machines 102 access to binary modification information 128, and for sending a representative binary 110 to host machines 102 that run different OS kernel versions 300. By way of example, and not limitation, the process 500 is described with reference to the previous figures, and in particular with reference to the suppression module 122 and the communications module 124 of the remote security system 104. The process 500 may continue from the process 400 (e.g., from block 422), as shown by the off-page reference "A" in FIGS. 4 and 5. Thus, the assumption in FIG. 5 is that the binary comparator 120 has identified identical binaries 110.

At 502, the binary comparator 120 may generate binary modification information 128 in response to identifying identical binaries 110. As described herein, particularly with reference to FIG. 3, the binary modification information 128 may include mappings between individual binaries 110 and OS kernel versions 300, along with associated modifications that are to be applied to the individual binaries 110 in the event that a host computing device 102 running the mapped OS kernel version receives the binary 110.

At 504, the host computing devices 102 with installed security agents 108 may be provided access to binary modification information 128. Access to the binary modification information 128 may be provided in various ways, such as by providing the host computing devices 102 a link to a remote storage location in the Cloud where the binary modification information 128 is maintained. This may be provided along with a binary 110 when the binary 110 is sent to the host computing device 102, or in a separate communication. Additionally, or alternatively, the binary modification information 128 can be downloaded to the host computing device 102 so that the host computing device 102 can have local access to the binary modification information 128 without reliance on network connectivity.

At 506, the suppression module 122 of the remote security system 104 may select a representative binary 110 from a group/subset of identical binaries 110. As an example, if a subset of identical binaries 110 includes at least a first binary 110(1) and a second binary 110(2), the first binary 110(1) may be selected at block 506 as a representative binary for the subset of identical binaries 110. Any suitable selection algorithm may be employed, such as selecting a first binary in terms of binary identifiers that can be ordered in a list, or analyzing characteristics of the binaries 110 to select a representative binary 110 that is a smallest size binary for purposes of conserving resources utilized in sending and storing the binary 110, or other factors that may influence the selection at block 506.

At block 508, the representative binary selected at block 506 may be sent, by the communications module 124 of the remote security system 104, over the network(s) 106, to the host computing devices 102 that run the OS kernel versions 300 associated with the subset of identical binaries 110 from which the representative binary 110 was selected. Continuing with the running example, if a subset of identical binaries includes the first binary 110(1) associated with a first OS kernel version 300(1) (e.g., version 1.X) and the second binary 110(2) associated with a second OS kernel version 300(2) (e.g., version 2.X), the first binary 110(1) (i.e., the representative binary 110) may be sent to all host computing devices that run the first OS kernel version 300(1) or the second OS kernel version 300(2), as depicted in FIGS. 1A and 1B. Notably, the sending at block 508 includes refraining from sending any of the other binaries 110 in the group/subset of identical binaries. Thus, in the running example, the second binary 110(2) would not be sent to either of the first host computing device 102(1) or the second host computing device 102(2). By refraining from sending suppressed binaries, resources are conserved. Of course, as noted above, other actions in addition to sending may be suppressed in the process 500. For example, the representative binary 110(1) may be tested for compiler bugs without testing the other binaries 110 in the subset of identical binaries 110.

Because selecting a representative binary 110 at block 506 and sending the representative binary 110 at block 508 depend on grouping the representative binary 110 with other identical binaries 110, it is to be appreciated that blocks 506 and 508 may occur in response to determining that first code in the code section 200 of the representative binary 110 matches second code in the code section 200 of at least one other binary 110 (See block 412 of the process 400), and also in response to determining that at least a portion of first data in the data section 202 of the representative binary 110 matches at least a portion of second data in the data section 202 of at least one other binary 110 (See block 416 of the process 400).

Accordingly, the process 500 (in combination with the process 400) may be carried out by the remote security system 104 to conserve resources by reducing the number of binaries 110 that are ultimately sent to host computing devices 102 as part of a software upgrade.

Figure 6:
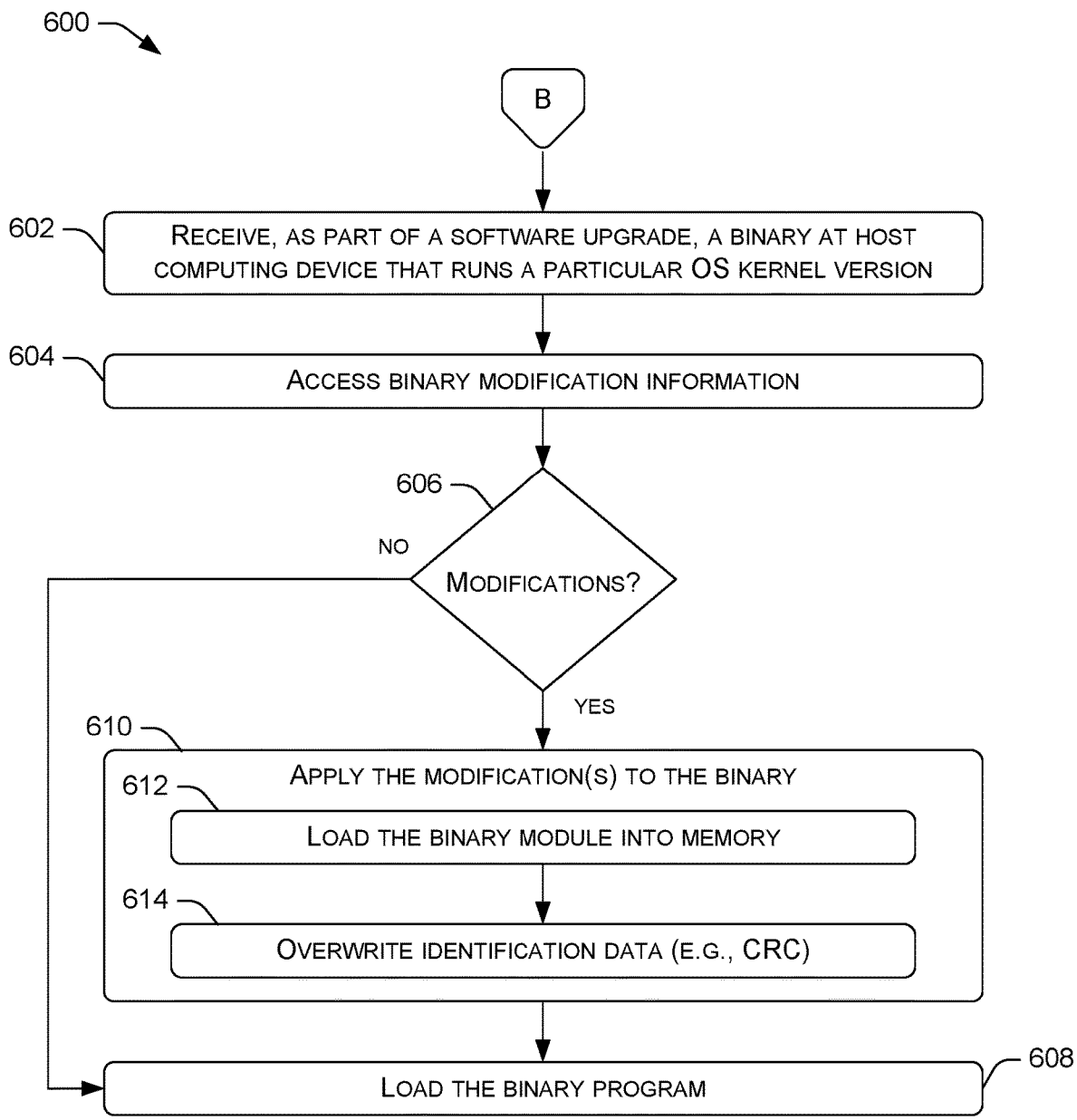
FIG. 6 illustrates an example process for executing binary modification logic on a host computing device upon receipt of a binary program from the remote security system.

FIG. 6 illustrates an example process 600 for executing binary modification logic on a host computing device 102 upon receipt of a binary program 110, such as the binary program 110(1) (i.e., a representative binary 110(1)) from the remote security system 104. By way of example, and not limitation, the process 600 is described with reference to the previous figures, and in particular with reference to the communications module 136, the binary modifier 138, and the binary loader 140 of the host computing device 102. The process 600 may continue from the process 500 (e.g., from block 508), as shown by the off-page reference "B" in FIGS. 5 and 6. Thus, the assumption in FIG. 6 is that the remote security system 104 has sent a representative binary 110 to the host computing device 102 implementing the process 600.

At 602, a host computing device 102, such as the host computing device 102(2) running the second OS kernel version 300(2) (e.g., version 2.X), may receive, via the communications module 136, a binary program 110(1) associated with a software upgrade for the host computing device 102. The software upgrade can be, for example, an upgrade of security agent software 108, or any other suitable software or firmware upgrade.

At 604, prior to loading the received binary program 110(1), the binary modifier 138 may access binary modification information 128 to lookup the mapping between the received binary 110(1) and the second OS kernel version 300(2) to determine if there are any modifications to apply to the received binary 110(1). The received binary 110(1) may include an identifier that can be referenced to lookup the mapping of the binary 110(1) with the OS kernel version 300(2) running on the host machine 102(2). An example of the binary modification information 128 is shown and described with reference to FIG. 3.

At 606, the binary modifier 138 may determine, based at least in part on the binary modification information 128, whether there are any modifications 302 to apply to the received binary 110(1), and if so what modification(s) 302 to apply. If the binary modifier 138 determines at block 606 that there are no modifications 302 to apply (e.g., by determining that a modification(s) 302 field in the binary modification information 128 is empty (or showing NULL)), the process 600 proceeds by following the "no" route from block 606 to block 608, where the binary 110(1) is loaded by the OS kernel 142 without modification. This is the case if the received binary 110(1) was created specifically for the OS kernel version 300 running on the host computing device 102. The OS kernel 142 may include load and unload functions for loading and unloading components, such as binaries 110, and/or drivers.

If, at block 606, the binary modifier 138 determines that there are modifications 302 to apply (e.g., by determining that a modification(s) 302 field includes one or more modification(s)), the process 600 proceeds by following the "yes" route from block 606 to block 610, where the binary modifier 138 applies the one or more modifications 302 to the received binary program 110(1) to obtain a modified binary program 110(1). The binary modification information 128 includes modifications for mappings between binaries 110 and OS kernel versions 300 when the binary 110 was not created specifically for the OS kernel version 300 in question, but was deemed identical to a different binary 110 that was created specifically for that OS kernel version 300. By modifying the binary program at block 610, the modified binary program 110(1) is rendered loadable by (or compatible with) the OS kernel version 300 running on the host computing device 102(2).

Applying the modification(s) 302 at block 610 may include modifying the binary program 110(1) to include identification data that is compatible with the particular OS kernel version 300(2) running on the host computing device 102(2). The modification(s) applied to the binary 110(1) may "patch up" the binary by making changes (e.g., overwriting) a certain part(s) of the object code of the binary 110(1). In an example, the binary modifier 138 may overwrite the CRC (or some other identification data, or fingerprint) in the received binary 110(1) with a CRC that is compatible with the OS kernel version 300(2) running on the host computing device 102(2). This allows the binary 110(1), as modified, to load into the OS kernel 142, which is otherwise expecting something slightly different than the binary 110(1) in its unmodified form. If the received binary 110(1) were to be left unmodified and loaded by the OS kernel version 300(2), the OS kernel 142 would consider the unmodified binary 110(1) too different to load, or otherwise unsafe to load, and would reject the binary 110(1) by failing to load the binary 110(1). The binary modifier 138, however, can obtain binary modification information 128 which indicates that the received binary 110(1) is in fact functionally equivalent to the binary 110(2) that was specifically created for the OS kernel version 300(2) running on the host machine 102(2), and is therefore safe to load on the host machine 102(2). The binary modifier 138 can overwrite the CRC of the received binary 110(1) so that, upon loading, the overwritten CRC matches the CRC that the OS kernel version 300(2) expects to see in a safe-to-load binary 110, rendering the modified binary 110(1) loadable by the OS kernel 142.

In some embodiments, applying the modification(s) 302 to the received binary 110(1) at block 610 may include loading the received, and unmodified, binary 110(1) into memory 134 (e.g., off disk to allocated memory) of the host computing device 102(2) at block 612, and overwriting, in the memory 134, original identification data included in the binary program 110(1) with the identification data retrieved from the binary modification information 128 at block 614. In some embodiments, the overwriting at block 614 may include overwriting the original CRC in the received binary 110(1) with a CRC that is uniquely associated with the particular OS kernel version 300(2) running on the host computing device 102(2).

At 608, after modification of the binary 110(1), the binary loader 140 may cause the OS kernel 142 to load the modified binary 110(1). The loading at block 608, after modification, may include passing the memory to the OS kernel 142 and requesting the OS kernel 142 to load the modified (or transformed) binary 110(1). The loading at block 608 may further include authenticating, by the OS kernel 142, the identification data (e.g., a CRC) in the modified binary 110(1) as part of a check to make sure that the binary 110(1) is safe to load on the host computing device 102(2). Because this identification data was modified at block 610 to render the binary 110(1) compatible with the OS kernel version 300(2), the binary program 110(1), as modified, will load properly.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
generating a first binary program for a first operating system (OS) kernel version;
generating a second binary program for a second OS kernel version,
wherein each of the first binary program and the second binary program:
is associated with a software upgrade, and
includes a code section and a data section;
determining that first code in the code section of the first binary program matches second code in the code section of the second binary program;
determining that at least a portion of first data in the data section of the first binary program matches at least a portion of second data in the data section of the second binary program;
in response to determining (i) that the first code matches the second code and (ii) that at least the portion of the first data matches at least the portion of the second data, sending the first binary program, and not the second binary program, to:
a first host computing device that runs the first OS kernel version, and
a second host computing device that runs the second OS kernel version; and
providing the first host computing device and the second host computing device access to binary modification information, wherein the binary modification information comprises:
a first mapping between the first binary program and the first OS kernel version, the first mapping having no associated modifications; and
a second mapping between the first binary program and the second OS kernel version, the second mapping having associated therewith one or more modifications to be applied to the first binary program to render the first binary program loadable by the second OS kernel version, wherein the one or more modifications associated with the second mapping include a modification to overwrite identification data in the first binary program with different identification data, the different identification data being compatible with the second OS kernel version.

2. The method of claim 1, wherein:
the software upgrade is an upgrade of security agent software;
the first binary program includes a first driver corresponding to the upgrade of the security agent software, the first driver configured to execute on host computing devices that run the first OS kernel version; and
the second binary program includes a second driver corresponding to the upgrade of the security agent software, the second driver configured to execute on host computing devices that run the second OS kernel version.

3. The method of claim 1, wherein the different identification data comprises a cyclic redundancy check (CRC) that is (i) uniquely associated with the second OS kernel version and (ii) authenticated by the second OS kernel version before the second OS kernel version loads any binary program.

4. The method of claim 1, further comprising:
categorizing the first binary program and the second binary program in a group of identical binaries; and
selecting the first binary program as a representative binary for the group of identical binaries.

5. A method comprising:
receiving a binary program at a host computing device that runs a particular operating system (OS) kernel version, the binary program being associated with a software upgrade for the host computing device;
prior to loading the binary program:
accessing binary modification information;
determining, based at least in part on the binary modification information, one or more modifications to be applied to the binary program to render the binary program loadable by the particular OS kernel version; and applying the one or more modifications to the binary program to obtain a modified binary program, wherein the applying of the one or more modifications comprises:

loading the binary program into memory of the host computing device; and modifying the binary program to include identification data that is compatible with the particular OS kernel version by overwriting, in the memory, original identification data included in the binary program with the identification data;

loading the modified binary program by the particular OS kernel version.

6. The method of claim 5, wherein the binary program:
corresponds to a different OS kernel version than the particular OS kernel version; and
includes code and data that match code and data included in a second binary program that corresponds to the particular OS kernel version.

7. The method of claim 5, wherein the identification data comprises a cyclic redundancy check (CRC) that is uniquely associated with the particular OS kernel version, the method further comprising, prior to the loading of the modified binary program, authenticating, by the particular OS kernel version, the CRC.

8. The method of claim 5, wherein:
the software upgrade is an upgrade of security agent software; and
the binary program includes a driver corresponding to the upgrade of the security agent software, the driver configured to execute on host computing devices that run a different OS kernel version than the particular OS kernel version.

9. The method of claim 5, wherein the particular OS kernel version represents a version of a Linux OS.

10. The method of claim 5, wherein the software upgrade is an upgrade of security agent software for a security agent installed on the host computing device, the security agent configured to observe events, and at least one of:
determine one or more actions to take based on the events; or
send the events to a remote security system.

11. The method of claim 5, wherein the binary modification information comprises:
a first mapping between the binary program and a different OS kernel version than the particular OS kernel version, the first mapping having no associated modifications; and
a second mapping between the binary program and the particular OS kernel version, the second mapping having associated therewith a modification to overwrite the original identification data in the binary program with the identification data.

12. A system comprising:
one or more processors; and
memory storing computer-executable instruction that, when executed by the one or more processors, cause the system to:
generate a first binary program for a first operating system (OS) kernel version;
generate a second binary program for a second OS kernel version,
wherein each of the first binary program and the second binary program:
is associated with a software upgrade, and
includes a code section and a data section;

determine that first code in the code section of the first binary program matches second code in the code section of the second binary program;

determine that at least a portion of first data in the data section of the first binary program matches at least a portion of second data in the data section of the second binary program;

in response to determining (i) that the first code matches the second code and (ii) that at least the portion of the first data matches at least the portion of the second data, send the first binary program, and not the second binary program, to:
a first host computing device that runs the first OS kernel version, and
a second host computing device that runs the second OS kernel version; and provide the first host computing device and the second host computing device access to binary modification information, wherein the binary modification information comprises:
a first mapping between the first binary program and the first OS kernel version, the first mapping having no associated modifications; and
a second mapping between the first binary program and the second OS kernel version, the second mapping having associated therewith one or more modifications to be applied to the first binary program to render the first binary program loadable by the second OS kernel version, wherein the one or more modifications associated with the second mapping include a modification to overwrite identification data in the first binary program with different identification data, the different identification data being compatible with the second OS kernel version.

13. The system of claim 12, wherein:
the software upgrade is an upgrade of security agent software;
the first binary program includes a first driver corresponding to the upgrade of the security agent software, the first driver configured to execute on host computing devices that run the first OS kernel version; and
the second binary program includes a second driver corresponding to the upgrade of the security agent software, the second driver configured to execute on host computing devices that run the second OS kernel version.

14. The system of claim 12, wherein the different identification data comprises a cyclic redundancy check (CRC) that is (i) uniquely associated with the second OS kernel version and (ii) authenticated by the second OS kernel version before the second OS kernel version loads any binary program.

15. The system of claim 12, wherein the computer-executable instructions, when executed by the one or more processors, further cause the system to:
categorize the first binary program and the second binary program in a group of identical binaries; and
select the first binary program as a representative binary for the group of identical binaries.

16. A system comprising:
one or more processors; and
non-transitory computer-readable media storing computer-executable instruction that, when executed by the one or more processors, cause the system to:
receive a binary program at a host computing device that runs a particular operating system (OS) kernel version, the binary program being associated with a software upgrade for the host computing device;

prior to loading the binary program:

access binary modification information;

determine, based at least in part on the binary modification information, one or more modifications to be applied to the binary program to render the binary program loadable by the particular OS kernel version; and apply the one or more modifications to the binary program to obtain a modified binary program, wherein applying the one or more modifications comprises:

loading the binary program into memory of the host computing device; and modifying the binary program to include identification data that is compatible with the particular OS kernel version by overwriting, in the memory, original identification data included in the binary program with the identification data; and load the modified binary program by the particular OS kernel version.

17. The system of claim 16, wherein the binary program:

corresponds to a different OS kernel version than the particular OS kernel version; and includes code and data that match code and data included in a second binary program that corresponds to the particular OS kernel version.

18. The system of claim 16, wherein:

the identification data comprises a cyclic redundancy check (CRC) that is uniquely associated with the particular OS kernel version;

the computer-executable instructions, when executed by the one or more processors, further cause the system to, prior to loading the modified binary program, authenticate, by the particular OS kernel version, the CRC.

19. The system of claim 16, wherein:

the software upgrade is an upgrade of security agent software; and the binary program includes a driver corresponding to the upgrade of the security agent software, the driver configured to execute on host computing devices that run a different OS kernel version than the particular OS kernel version.

20. The system of claim 16, wherein the particular OS kernel version represents a version of a Linux OS.

21. The system of claim 16, wherein the software upgrade is an upgrade of security agent software for a security agent installed on the host computing device, the security agent configured to observe events, and at least one of:

determine one or more actions to take based on the events; or send the events to a remote security system.

22. The system of claim 16, wherein the binary modification information comprises:

a first mapping between the binary program and a different OS kernel version than the particular OS kernel version, the first mapping having no associated modifications; and a second mapping between the binary program and the particular OS kernel version, the second mapping having associated therewith a modification to overwrite the original identification data in the binary program with the identification data.

* * * * *